US008038037B2

(12) United States Patent
deVirag et al.

(10) Patent No.: US 8,038,037 B2
(45) Date of Patent: Oct. 18, 2011

(54) UTENSIL DISPENSER SYSTEM

(75) Inventors: Francis Kiss deVirag, Kirtland Hills, OH (US); Ileen Rosner, Novelty, OH (US); Jonathan Rosner, Novelty, OH (US)

(73) Assignee: Innovation Consumer Solutions, LLC, Novelty, OH (US)

( * ) Notice: Subject to any disclaimer, the term of this patent is extended or adjusted under 35 U.S.C. 154(b) by 171 days.

(21) Appl. No.: 11/924,145

(22) Filed: Oct. 25, 2007

(65) Prior Publication Data
US 2009/0108025 A1 Apr. 30, 2009

(51) Int. Cl.
*B65D 88/54* (2006.01)
(52) U.S. Cl. ............... 222/333; 222/192; 30/141
(58) Field of Classification Search .......... 222/205, 222/92, 93, 106, 78, 192, 212, 333, 390, 222/391; 30/141, 125, 132.3
See application file for complete search history.

(56) References Cited

U.S. PATENT DOCUMENTS

| | | | | |
|---|---|---|---|---|
| 3,133,679 A | * | 5/1964 | Brown | 222/205 |
| 4,191,187 A | * | 3/1980 | Wright | 604/155 |
| 4,335,834 A | * | 6/1982 | Zepkin | 222/63 |
| 4,529,401 A | * | 7/1985 | Leslie et al. | 604/131 |
| 4,830,222 A | * | 5/1989 | Read | 222/106 |
| 4,880,409 A | * | 11/1989 | Bergkvist et al. | 604/73 |
| 4,957,226 A | * | 9/1990 | Pacia | 222/643 |
| 4,978,335 A | * | 12/1990 | Arthur, III | 604/67 |
| 5,137,183 A | * | 8/1992 | Mikulec et al. | 222/192 |
| 5,139,484 A | * | 8/1992 | Hazon et al. | 604/154 |
| 5,176,502 A | * | 1/1993 | Sanderson et al. | 417/18 |
| 5,377,879 A | * | 1/1995 | Isaacs | 222/205 |
| 5,462,101 A | * | 10/1995 | Mouchmouchian | 141/364 |
| 5,491,895 A | * | 2/1996 | Lee | 30/125 |
| 5,928,201 A | * | 7/1999 | Poulsen et al. | 604/208 |
| 5,954,697 A | * | 9/1999 | Srisathapat et al. | 604/155 |
| 6,003,736 A | * | 12/1999 | Ljunggren | 222/309 |
| 6,423,035 B1 | * | 7/2002 | Das et al. | 604/155 |
| 6,675,482 B1 | * | 1/2004 | Gilbert et al. | 30/141 |
| 7,210,600 B1 | * | 5/2007 | Delio, Jr. | 222/92 |
| 7,390,314 B2 | * | 6/2008 | Stutz et al. | 604/155 |
| 2002/0148852 A1 | * | 10/2002 | Schultz | 222/78 |
| 2004/0176725 A1 | * | 9/2004 | Stutz et al. | 604/155 |

FOREIGN PATENT DOCUMENTS

GB 2382020 * 5/2003 ............... 222/158
* cited by examiner

*Primary Examiner* — Lien T Ngo
(74) *Attorney, Agent, or Firm* — Turocy & Watson, LLP

(57) ABSTRACT

A dispenser for food material that facilitates spreading of the material is disclosed. The dispenser can comprise a unitary construction, or can be composed of a plurality of components that can be fastened together. Disposable cartridges containing food material can be attached to the dispense, and the material within can be dispensed into a utensil such as a spoon for serving. The dispense provides metered dispensing.

20 Claims, 3 Drawing Sheets

UTENSIL DISPENSER SYSTEM

TECHNICAL FIELD

Described is a device for dispensing material. In particular, the disclosure relates to dispensing foodstuffs evenly from a container into a spoon or similar utensil that forms an integral part of the fluid packaging.

BACKGROUND

Feeding oneself and other individuals can be a challenging task, requiring coordination beyond that of the average adult, and certainly beyond that of persons with disabilities or other limitations. Many individuals are unable to feed themselves; babies, the elderly, and the disabled frequently require the attention of a skilled individual to spoon-feed them. Food packaged for such special cases require opening at least one package, then using an external device such as a spoon to remove the contents from the package, and ultimately to deliver the contents. Serving foodstuffs such as baby food from conventional packaging requires a great deal of patience, coordination, and is almost assuredly a two-handed affair. As the contents are consumed from a bottle or equivalent, the void space inside the container grows, allowing air to adversely affect the freshness of the contents.

Use of a traditional utensil such as a spoon and traditional packaging is also challenging for children, elderly persons, persons with disabilities, and physically challenged individuals to use. Holding the container steady while scooping the contents, holding the spoon steady while delivering the contents to the recipient, all require concentration and skill the can exceed the capabilities of many. The utensils associated with conventional eating means must be washed after every minor use, which is a particular inconvenience during such activities as traveling, picnics, and other occasions where typical kitchen amenities are not present.

Another shortcoming of conventional packaging and utensil configurations is the inability to accurately measure the dispensed quantity. Measuring spoons typically use the absolute limit of their capacity as the measuring feature, requiring transfer of a completely full spoon—precarious at best. Measuring cups provide some relief, but very viscous foodstuffs such as peanut butter and cream cheese are difficult to measure this way since an accurate measurement may only be achieved by packing the product, which is messy and causes further measurement inaccuracies. A solution to accurate measurement and use of foodstuffs is particularly pertinent for portion control, dieting, and restaurant settings where consistency is important.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides for material, including but not limited to foodstuffs, to be packaged in a container that can include means for dispensing the material into an integral utensil such as a spoon. The innovative packaging can perform the role of dispensing and serving, obviating the need for additional utensils to remove the material from their packaging and to serve them. Pressure can be applied to a chamber that contains the material, causing expulsion from a strategically placed aperture or apertures located on or near a concave receptacle that can be used as a spoon. The chamber can be deformed or altered to create the pressure, and the change can be maintained between dispensing instances so as to reduce void space in the chamber and thus maintain freshness.

In an aspect of the subject innovation, pressure can be applied in the chamber by means of a powered device such as a motor (electric or otherwise), pneumatic equipment, hydraulic equipment. The powered device can include an on/off switch that can be operated by a user to cause dispensing of the contents of the chamber during desired intervals. The switch can be a typical on/off switch, where the current status will persist unless switched by the user, or a biased switch where pressure or other influence from the user is required to maintain the unbiased position. Manual pressure can supplement or supplant the powered pressure, and can be assisted by a rotating finger screw, a lever, a pump, a squeezable chamber, and the like.

In another aspect, the subject innovation provides an at least two-part system, where one part contains the foodstuffs, and the other part contains the mechanism that applies the pressure to the chamber. In an aspect, a third part, containing concave receptacle, can form part of either of the first two parts, or can stand alone. The separate parts can fasten together using any known means. Any one or combination of these parts can be disposable or reusable. Alternatively, the innovative apparatus can be a unitary device that can be reusable and accept refill contents, or disposable and provide one-time use.

A related aspect of the subject innovation provides for a multiplicity of serving utensils that receive the fluid material. Interchangeable serving shapes can be chosen for different applications. Among other variables, the viscosity of the dispensed material can affect the choice of spreader configuration. If small doses are desired the concave receptacle can be small and the apertures through which the fluid material passes can be smaller, for example, while for large doses can require may have fewer, larger holes. In addition, the shape of the dispensed fluid can be altered by the choice of a spreader configuration.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity. Furthermore, all or portions of the subject innovation may be implemented as a method, apparatus or article of manufacture using standard engineering techniques.

Figure 1:
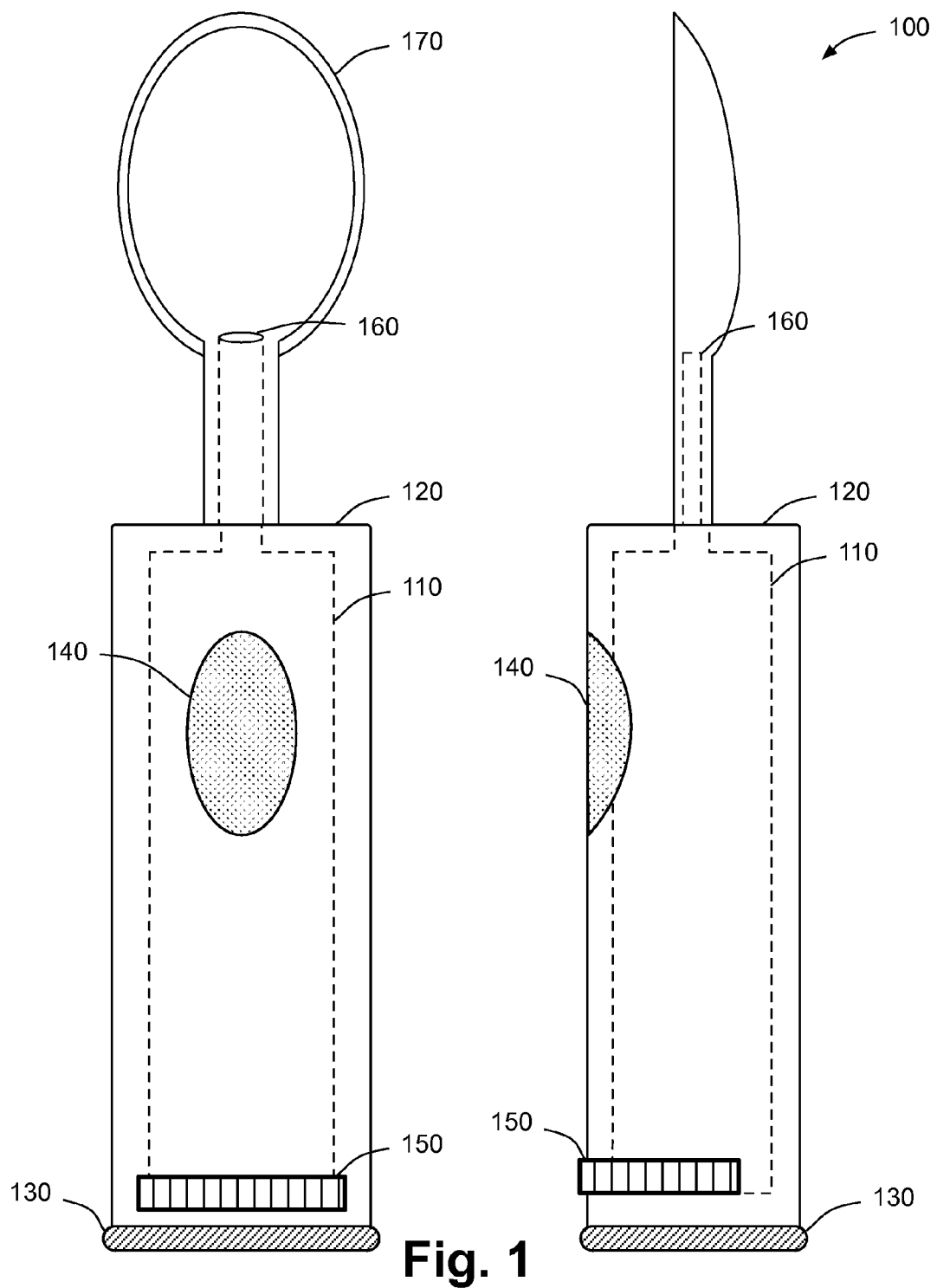
FIG. 1 depicts a top view and a side view of the fluid dispensing apparatus according to an aspect of the subject innovation.

FIG. 1 depicts an apparatus that dispenses an edible material and facilitates eating and/or serving of the material directly from the apparatus. It is to be appreciated that the fluid material and the serving utensil can comprise virtually any fluid material and utensil combination. The term "fluid" herein connotes the technical definition of fluid: any material that deforms under any shear force. Fluid material may contain objects that are not fluid (e.g., chunky peanut butter, baby food), or be fluid at certain temperatures or conditions and not others, and still fall within the definition of fluid. The fluid material can be edible. The examples used throughout this application are but a small illustration of possible applications of the subject disclosure, and one having ordinary skill in the art will appreciate that the subject innovation is not limited to the examples discussed herein.

Apparatus 100 is an apparatus that dispenses material and facilitates serving and/or eating of the material with the use of an attached utensil. In an aspect, the apparatus 100 is a hand-held device, that dispenses edible material onto another edible surface (e.g., baby food, into a spoon). Apparatus 100 can comprise a unitary, one-piece construction, or can be composed of a plurality of connectable parts that can be fastened together. A chamber 110 can contain the material which is to be dispensed from the apparatus 100. For example, chamber 110 can contain baby food, yogurt, oatmeal, or another edible or non-edible material. Chamber 110 can be constructed of a flexible material, and can be deformed under pressure to cause the material within to exit the chamber and eventually reach the target surface. Chamber 110 can include graduation markings and a transparent portion to permit inspection of the contents of the chamber and the quantity remaining within the chamber. Alternatively, the chamber 110 can comprise a more rigid material with a plunger at the base which can be driven toward a distal end of the apparatus 100 to cause expulsion of the contained material. In the case of a multi-part composition of apparatus 100, chamber 110 can be constructed to contain a fixed amount of material, and when the material is exhausted a new chamber 110 containing a fresh supply of material can be introduced and used. In the case of a unitary construction, the entire apparatus can be discarded once the material in the chamber 110 is spent. In this case, it can be desirable to construct the apparatus 100 of a more inexpensive construction, as will be more fully described below.

Apparatus 100 also can include a body 120 which comprises the main housing for internal components. In an aspect, body 120 comprises a sleeve-like construction which can receive a chamber 110. Body 120 can also serve as the primary means for the user to grasp the apparatus 100, and as such can be ergonomically shaped, and be constructed of a material pleasing to the touch, and can take an attractive shape and size. A base portion 130 can include a substantially flat bottom surface to facilitate placing the apparatus on a flat surface in a stable manner. Base portion 130 can also house any electrical components and/or a motor or other power source adapted to create pressure on the contents of the chamber 110 to expel the material from the chamber. A grip portion 140 can accommodate a user's thumb or other part of the hand to facilitate confident grasping of the apparatus. Further, grip portion 140 can include a depressible button that can operate some component of the apparatus 100, such as the mechanism for creating pressure on the contents of the chamber 110. Such a button can be located in any convenient location on the apparatus 100, and can comprise virtually any appropriate mechanism (biased or otherwise) such as a lever, a switch, a button, a knob, a handle, and the like. For purposes of brevity, this aspect will be described herein as a biased, depressible button.

In order to supplement (or, in an aspect, supplant) the operation of the power source, a manually rotatable wheel 150 can be employed to create pressure on the contents of the chamber. It is to be appreciated that a wheel configuration as shown is only one of many possible means for creating manual pressure, and the subject innovation is not limited to the examples shown and described in any way.

Pressure in the chamber 110 can cause the material inside the chamber 110 to exit the apparatus 100 through an aperture 160 (or apertures) in the utensil 170. The aperture 160 can include a valve that prevents the material from returning toward the chamber 110. Once the material has exited the utensil 170 through the apertures 160, the material can be eaten or served from the utensil 170 as a conventional spoon or other utensil. In the aspect shown, utensil 170 comprises spoon; however, the utensil 170 can comprise virtually any shape and aperture configuration 160 to accommodate the material to be dispensed, and the circumstances of use. In the multi-part aspect mentioned above, the utensil 170 can be a separate part, which can be fastened to the remainder of the apparatus 100, and as such can be chosen for different materials, surfaces, and applications. In the case of a unitary construction, the shape and aperture arrangement of the utensil 170 can be chosen appropriately as well, depending on several variables including viscosity and make-up of the material, the circumstances of use, and so forth.

The apparatus depicted in FIG. 1 can be used to feed another individual such as a baby. Conventional baby foods and serving means are a bottle and separate spoon. Such configuration requires at least two hands to operate (one for the spoon, and another for the bottle or jar) and can thus present difficulties that are mitigated by the subject innovation. A single hand can grasp the apparatus 100 and serve the child, leaving the other hand free for other important tasks such as supporting the child, entertaining the child, and the like. Also, feeding oneself is facilitated with the present novel apparatus 100.

Figure 2:
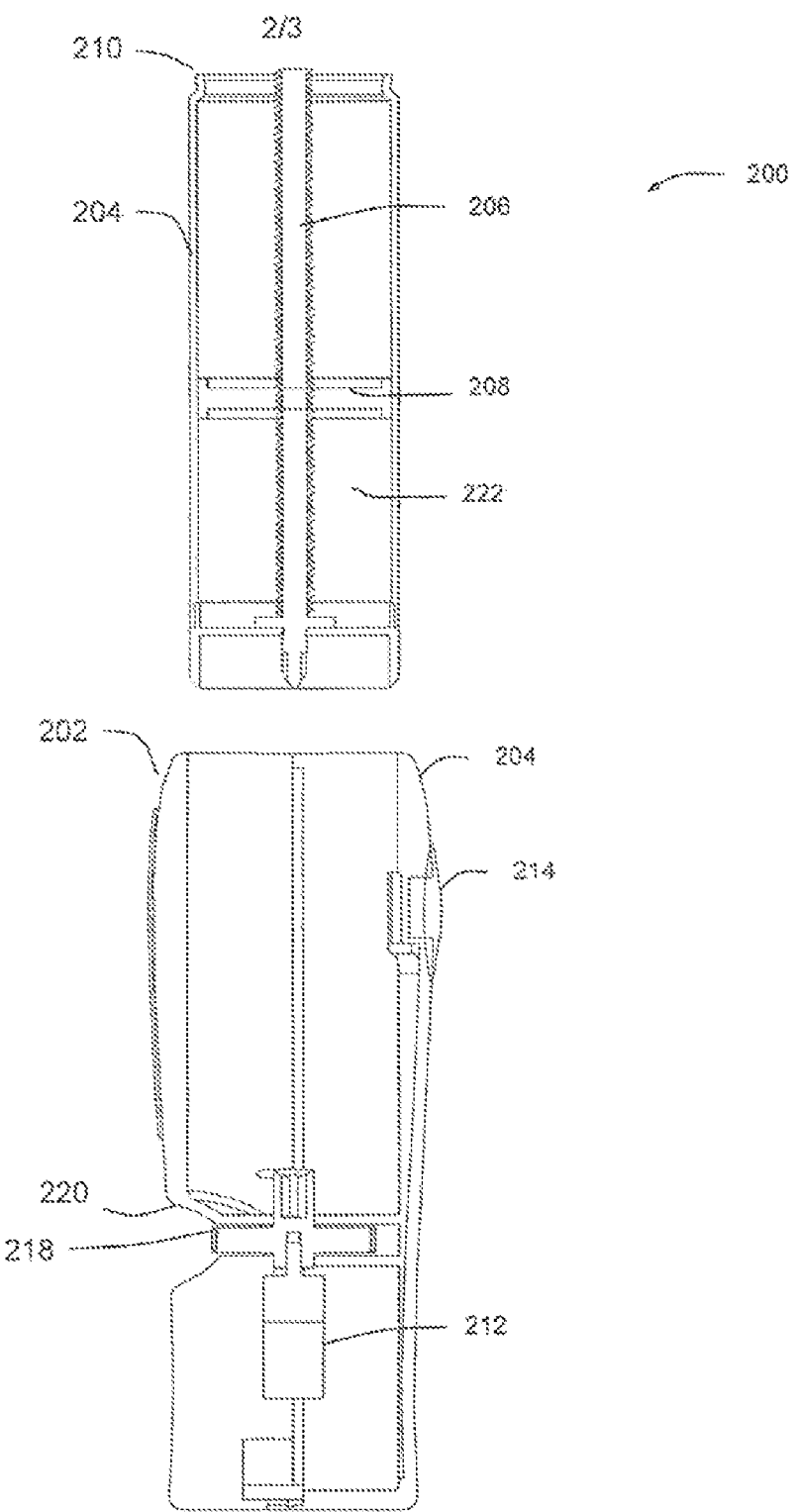
FIG. 2 illustrates detailed operation of a chamber that can house a fluid material, including an embodiment of the expulsion mechanism.

FIG. 2 depicts an internal view of an apparatus 200 that can dispense a fluid material and facilitate serving the material.

Body 202 can serve as the handling portion of the apparatus 200, and thus can be shaped and sized in an ergonomic, attractive manner. Chamber 204 can contain the fluid material to be dispensed; chamber 204 can itself be housed within body 202. In the example shown, body 202 and chamber 204 are coaxially related, and are substantially cylindrical in shape. However, it is to be appreciated that a multitude of shapes can be employed to house a chamber within a body without departing from the scope or spirit of the subject innovation. To dispense the fluid material, pressure can be applied to the material within the chamber 204. This can be accomplished in a variety of ways, one of which is depicted here as a central threaded member 206, a plunger 208, and a mechanism of driving the plunger 208 toward the distal end 210 of the apparatus 200. In this example, the threaded member 206 is rotated by a motor 212. The motor can be powered electrically, or by any other means of creating a torque on the threaded member 208, rotation of which causes plunger 208 to move toward the distal end 210 of the apparatus 200, and expel the material from the chamber 204. The motor 212 can include a microprocessor to control the power output by monitoring variables such as rotation speed, pressure output and the like. A button 214 can be located on the body 202 or other appropriate location which can be in electrical contact with motor 212. Depressing the button 214 can cause an electrical signal to travel to motor 212, engaging the motor 212 to rotate the threaded member 206.

In an aspect, button 214 (in conjunction with other, internal and/or external components) can facilitate metered dispensing of material. A user can determine an amount of material to be dispensed, and enter this information into the apparatus and when the button 214 is depressed, the determined amount is dispensed. The user can input the desired amount by means of a dial or a digital LCD screen (neither shown) in a manner well known in the art. Pressure can be applied continuously or increasingly until the proper amount has been dictated. The apparatus 200 can measure the displacement or deformation of the chamber 204 in order to calculate when a sufficient amount of material has been dispensed. In the example shown, a relatively precise measurement of material can be interpreted directly from the rotations of the threaded member 206. The pitch of the threads, and the volume of the chamber are all the information needed to calculate an accurate quantity as a function of rotations. Depending on the configuration of the chamber and the source of the pressure, there are metrics available to determine the quantity of material dispensed.

Depending on certain variables such as the viscosity of the material in the chamber 204, the shape and arrangement of the exit apertures, the utensil used to serve the expelled material, and the like, the motor 212 can supply differing levels of pressure to the chamber 204. In the case of a highly viscous material, more power can be drawn from the motor to compensate for the resistance caused by the high viscosity. In addition, a modified gear ratio can be chosen to accommodate a more viscous material; slowing down the rotation, but increasing the torque applied to the material can be a beneficial configuration. In an aspect, a manual power input can be included to supplement or supplant the power from the motor. In the exemplary embodiment shown, a manually rotatable wheel 218, located coaxially with threaded member 206 and motor 212, can be accessed through a recess 220 in the body 202. Turning the wheel can exert the same force upon the chamber 204 as caused by the motor 212, and can be used to assist the motor if the material does not flow uniformly or as desired. The recess 220 can serve to ensure that only deliberate efforts to rotate the wheel 218 will cause rotation thereof, while not significantly obstructing access to the wheel 218. In an aspect, the motor can sense when the wheel 218 is being rotated by a user, and cease operation despite depression of the button 214. In this manner, the user's torque will not interfere with the motor 212, and vice versa. In another aspect, the manual input can supplement the motor's 212 operation, or the motor 212 can be omitted completely, leaving the manual input of power the sole source of pressure used to dispense material.

The above discussion of the motor 212 and wheel 218 are, of course, merely one example of a configuration of the apparatus 200 according to the subject disclosure. As will be appreciated by one having ordinary skill in the art, there are myriad equivalent sources of power that can be used to create the necessary pressure to dispense the material from chamber 204. The pressure application mechanism can include a pneumatic pressure source brought into communication with the chamber 204, and an increase in the pneumatic pressure can cause the material in the chamber 204 to be dispensed. The pneumatic pressure can be created by a motor located at the base of apparatus 200 (much like motor 212) or can be supplied through a hose or tube connected with an external source of pneumatic pressure, as is well known in the art. Hydraulic pressure can be employed in substantially the same manner as pneumatic pressure. Moreover, pressure can be created by squeezing the chamber 204 transversely, deflecting the side walls inward. Any of these approaches to creating pressure in the chamber can be powered by an internal power source (e.g., battery, fuel cell) or by manual exertion by the user.

In another aspect of the subject disclosure, the material inside the chamber 204 is kept from excessive contact with external elements such as air, by reducing the internal dimensions of the chamber 204 eliminates or substantially reduces the amount of void space within the chamber. In contrast, a conventional packaging arrangement creates void space equal in volume to the product dispensed from the packaging (e.g., baby food jars, yogurt containers), severely damaging product freshness. To mitigate this situation, as plunger 208 moves toward the distal end 210 of apparatus 200, void space 222 behind plunger 208 can be kept out of contact with the material.

The embodiment shown can comprise a multi-component configuration, where sub-components can fasten together to form the apparatus 200. Chamber 204 can be a cartridge which can be shaped to fit within body 202, and be secured by a snap-mechanism, a friction fit, a threaded engagement, a vacuum seal, or any other equivalent fastening mechanism. Cartridge chamber 204 can contain a liner (not shown) made of more flexible material that houses the fluid material which can be deformed under pressure to expel its contents as desired. In an aspect, body 202 can be constructed for relative long-term use, and can receive a plurality of cartridge chambers 204, which can be disposable.

Figure 3:
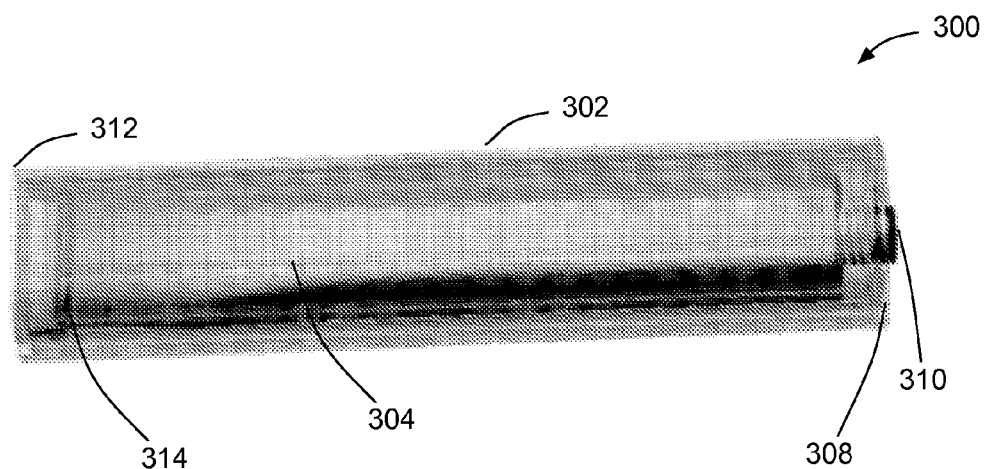
FIG. 3 represents a configuration of the expulsion mechanism and the housing of the fluid material.

FIG. 3 illustrates another embodiment of a fluid material dispensing apparatus 300 comprising an encasement and an internal cartridge. The main body portion 302 of the apparatus 300 can contain the fluid material to be dispensed in a reservoir 304. Pressure can be applied to the material to cause expulsion from the reservoir 304 and onto utensil (not shown) for serving.

Apparatus 300 can be constructed as a unitary article, which can be sold as a unit and used until reservoir 304 is empty. According to this aspect, the entire unit can be discarded and replaced. In another related aspect, the utensil and the reservoir 304 can be replaced, and the body 302 can be reused with new a reservoir 304. In the case of the reusable body 302, a replaceable reservoir 304 can comprise a tube or other deformable container of fluid material which can be inserted into the body 302. At a distal end 308, the opening 310 of the reservoir 304 can be connected to a corresponding opening in the body 302 that permits the fluid material to flow from the tube 304 into the utensil, and eventually be served. To accommodate several sizes of reservoir 304 openings, an adjustable adapter, or a set of a number of standard sized adapters, can be provided. At a proximal end 312 of the apparatus 300, a variety of different pressure-applying mechanisms can be employed to expel toothpaste from the reservoir 304, and an equally varied number of power sources can be utilized.

In one aspect, a roller 314, located initially near the proximal end 312, can be rolled toward the distal end 308, forcing the material from the reservoir 304. This mechanism can be powered by an electric motor (or other automated means of power delivery) or by manual input by means of a rotor, a dial, a lever, or crank, a spring, or the equivalent. Automated means of power delivery (e.g., a motor) can also be combined with manual power input (e.g., crank, lever, spring, dial).

Figure 4:
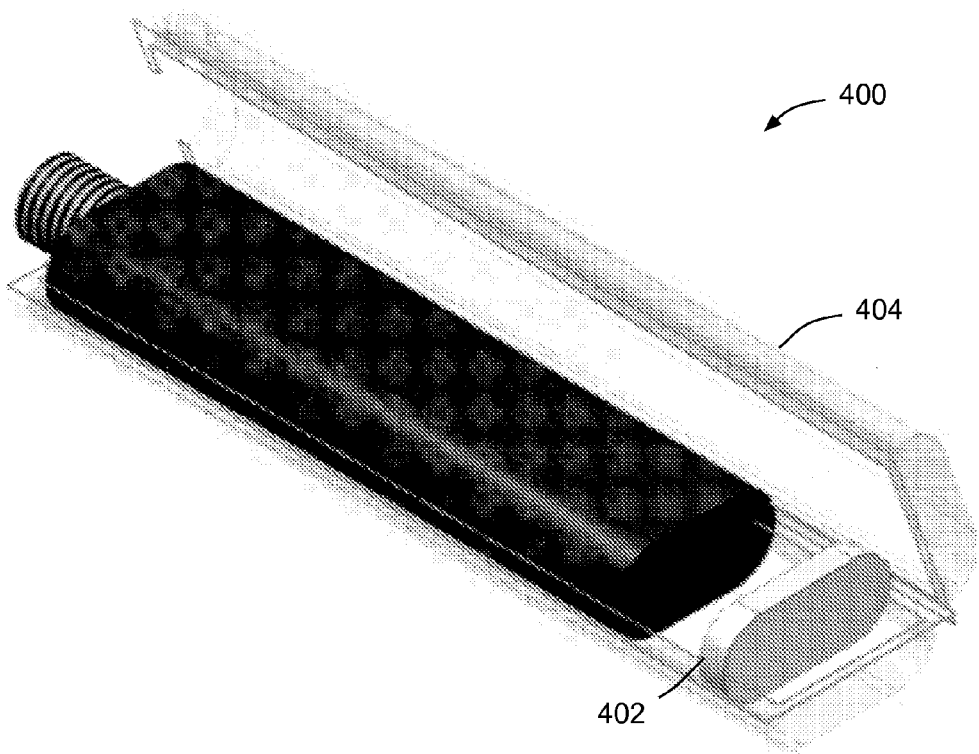
FIG. 4 represents a configuration of the expulsion mechanism and the housing of the fluid material.

FIG. 4 shows another aspect of the subject innovation, featuring a plunger, 402 which can operate to expel fluid material. An encasing 404 can receive a reservoir 406 containing edible or non-edible fluid material. An opening 408 can communicate with an aperture in a utensil to deposit a quantity of the material onto the utensil for serving. As with other components disclosed herein, the component parts (or any sub-set thereof of the apparatus 400 shown and described can be designed for continued use, or for a short lifespan. For example, encasing 404 can be constructed of a more durable material, configured to accept several reservoirs 406 and to dispense the material held in the reservoirs 406; or, reservoir 406 can be filled with fluid material repeatedly as needed and re-used. The design of the apparatus, and the various embodiments described herein, offer several distinct advantages over conventional toothpaste dispensing configurations.

It is to be appreciated that the foregoing examples are merely for illustration, and that the subject disclosure is not limited to the examples given here. What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. An apparatus that dispenses fluid material comprising:
a chamber that contains fluid material;
a dispensing portion having a dispensing end with at least one aperture, a base opposite the dispensing end, and a pressure applying mechanism, the dispensing portion is configured to receive the chamber so that the dispensing portion is placed in fluid communication with the chamber, wherein the dispensing portion is ergonomically shaped to be grasped with a hand and comprises a grip portion that accommodates grasping with the hand and a depressible button; wherein
the base portion comprises a substantially flat bottom surface and includes an electric motor that drives the pressure applying mechanism to create motorized pressure that causes the fluid material to dispense through the at least one aperture, and wherein the button is operatively coupled to the electric motor and engages the electric motor when depressed; wherein
the pressure applying mechanism further receives manual power input to create manual pressure that causes the fluid material to dispense through the at least one aperture, wherein the electric motor can sense when manual power input is received and ceases operation despite depression of the button; and
a utensil that connects to the dispensing end of the dispensing portion and receives the fluid material dispensed from the at least one aperture.

2. The apparatus of claim 1, the chamber is constructed of a flexible material and the pressure deforms the chamber to dispense the fluid material.

3. The apparatus of claim 1, the utensil is a spoon.

4. The apparatus of claim 1, wherein the base portion further comprises a microprocessor operatively coupled to the electric motor to control power output of the electric motor, wherein the quantity of fluid material dispensed is a function of power output.

5. The apparatus of claim 1, the pressure is at least one of mechanical, pneumatic, or hydraulic pressure.

6. The apparatus of claim 1, the chamber comprises a plunger and screw mechanism, rotation of the screw causes the chamber to constrict.

7. The apparatus of claim 1, the pressure applying mechanism applies pressure until a predetermined quantity of the fluid material is dispensed.

8. The apparatus of claim 1, the chamber, the pressure applying mechanism, the base, the dispensing portion, and the utensil are separate parts that can be fastened together.

9. A method of serving fluid material from a utensil, comprising:
holding a dispensing apparatus containing fluid material in a hand, wherein a utensil is attached to the dispensing apparatus and contains at least one aperture through which the fluid material exits the dispensing apparatus;
creating pressure in the chamber with an electric motor or manual power input;
sensing when pressure is created with manual power input and ceasing the creating pressure with the electric motor;
forcing the fluid material onto the utensil through the at least one aperture in response to the creating the pressure; and
serving the fluid material from the utensil with the hand.

10. The method of claim 9, further comprising activating a switch on the dispensing apparatus with the hand to activate the electric motor.

11. The method of claim 9, further comprising:
selecting an amount of material to be dispensed; and
dispensing the amount of material.

12. The apparatus of claim 4, further comprising an input means in which information relating to the quantity of fluid material to dispense is input, the input means is operatively coupled to the microprocessor, and wherein the microprocessor controls the power output of the electric motor so that a quantity of fluid material is dispensed which corresponds to the information.

13. The method of claim 9 further comprising:
inputting information pertaining to the quantity of material to dispense via an input means located on the apparatus, wherein the input means is operatively coupled to a microprocessor, and wherein the microprocessor controls the amount of pressure created with the electric motor, wherein the amount of pressure correlates to the amount of material to dispense; and dispensing the material in accordance with the information pertaining to the quantity of material to dispense that is input.

14. The apparatus of claim 1, wherein the dispensing portion and the chamber are coaxially related, and are substantially cylindrical in shape.

15. The apparatus of claim 4, wherein the power output is a function of at least one of: the viscosity of the material in the chamber, the shape and dimension of the at least one aperture, or the utensil.

16. The apparatus of claim 6, further comprising a manually rotatable wheel to facilitate rotation of the screw, the wheel is located in a recess in the dispensing portion and can be accessed through the recess.

17. The method of claim 9, wherein the creating pressure with manual power input is performed by the hand.

18. The method of claim 13 further comprising, varying the amount of pressure created with the electric motor in response to at least one of the viscosity of the material in the chamber, the shape and dimension of the at least one aperture, or the utensil.

19. The apparatus of claim 1, wherein the chamber comprises a flexible material that can be deformed under pressure.

20. The apparatus of claim 1, wherein the base facilitates placing the apparatus on a flat surface in a stable manner.

* * * * *